(12) United States Patent
Granqvist

(10) Patent No.: US 8,132,938 B2
(45) Date of Patent: Mar. 13, 2012

(54) INDOOR LIGHT BALANCING

(75) Inventor: Claes Goran Granqvist, Uppsala (SE)

(73) Assignee: ChromoGenics AB, Uppsala (SE)

( * ) Notice: Subject to any disclaimer, the term of this patent is extended or adjusted under 35 U.S.C. 154(b) by 420 days.

(21) Appl. No.: 12/445,841

(22) PCT Filed: Oct. 16, 2007

(86) PCT No.: PCT/SE2007/050742
§ 371 (c)(1),
(2), (4) Date: Apr. 16, 2009

(87) PCT Pub. No.: WO2008/048181
PCT Pub. Date: Apr. 24, 2008

(65) Prior Publication Data
US 2010/0296081 A1    Nov. 25, 2010

(30) Foreign Application Priority Data

Oct. 17, 2006 (SE) .................................. 0602180-2

(51) Int. Cl.
*F21S 8/00* (2006.01)
(52) U.S. Cl. ........ 362/276; 362/552; 362/554; 362/559; 362/147
(58) Field of Classification Search .................. 362/276, 362/552, 554, 559, 576, 147; 356/213; 349/16, 349/92, 187
See application file for complete search history.

(56) References Cited

U.S. PATENT DOCUMENTS

| | | | |
|---|---|---|---|
| 6,671,008 B1 * | 12/2003 | Li et al. ........................... | 349/16 |
| 6,690,268 B2 * | 2/2004 | Schofield et al. ............. | 340/438 |
| 7,106,293 B2 * | 9/2006 | Pirhonen ....................... | 345/102 |
| 2005/0063036 A1 | 3/2005 | Bechtel et al. | |

OTHER PUBLICATIONS

Page et al., "On-Site Performance of Electrochromic Glazings Coupled to an Anidolic Daylighting System", Solar Energy 81, Feb. 22, 2007, pp. 1166-1179, Science Direct.
Lee et al., "Daylighting Control Performance of a Thin-Film Ceramic Electrochromic Window: Field Study Results", Energy and Buildings 38, Feb. 15, 2005, pp. 30-44, Science Direct.
Lee et al., "Low-Cost Networking for Dynamic Window Systems", Energy and Buildings 38, Dec. 19, 2003, pp. 503-513, Science Direct.
International Search Report from corresponding PCT/SE2007/050742 dated Jan. 22, 2008.

* cited by examiner

Primary Examiner — Sharon Payne
(74) Attorney, Agent, or Firm — Young & Thompson

(57) ABSTRACT

An illumination system (1) is based on a window (21) having controllable transmittance and a light guide system (31) arranged for transferring light from a light guide input (33) to a light guide output (34). The light guide output is located in a same space (50) as the window (21), but at a distance therefrom (21). The illumination system includes elements for balancing (40) the transmittance of the window and a throughput of the light guide system. Preferably, the window is an outer window, the light guide input (33) is arranged for gathering day light and the light guide output (34) is arranged to illuminate an area (52) within sight from the window (21). Preferably the transmittance of the window (21) and/or the light throughput of the light guide system (31) are controlled. A method for illuminating a space (50) having a window (21) with controllable transmittance is presented.

20 Claims, 7 Drawing Sheets

INDOOR LIGHT BALANCING

TECHNICAL FIELD

The present invention relates in general to illumination, and in particular to indoor illumination.

BACKGROUND

Windows are provided in buildings in order to allow sight outwards and inwards and for admitting daylight to illuminate spaces within the buildings. Deep spaces in buildings typically obtain day-lighting in a zone close to the windows whereas zones far from the windows may require artificial lighting to reach a sufficient illumination level. In essence, a bright light near to the windows make the eyes adapt in such a way that regions far from the windows are experienced as too dark, even in the presence of additional lighting. The differences in illumination in a building space caused by day-lighting levels can be appreciated by realizing that full sunlight outdoors may be of the order of 100 klx (kilolux=1000 candela/$m^2$), while a TV-studio typically is lit to 1 klx and an artificially well-lit office has 0.4 klx. Illumination in areas far from a window that is considered to be sufficient when it is dark outside, can be experienced as totally insufficient when clear sun light is present at the window. The reason is that the eye adapts its sensitivity to the highest of the different levels of illumination within sight. In practice the eye adapts to regions close to the window when the sun light is present, which makes the areas far from the window to appear as very dark, even if the absolute illumination level is appropriate. Furthermore, very high contrasts tend to appear as mirror images at e.g. computer screens or other glossy surfaces.

One approach to overcome this situation is to use some kind of arrangement at the window for keeping the strong light out. This could e.g. be a pure mechanical arrangement, such as a curtain, or more technically advanced systems, such as electrochromic windows e.g. disclosed in "Application issues for large-area electrochromic windows in commercial buildings" by E. S. Lee and D. L. DiBartolomeo in Solar Energy Materials & Solar Cells 71 (2002) pp. 465-491. However, the indoor space will then typically be so dark that artificial light is necessary even in day time, which increases the need for electrical power used for illumination purposes.

A problem with conventional indoor illumination is thus that day light entering windows cause too high illumination in areas close to the window, which prohibits the eye to adapt to the illumination level at areas far from the window. Solutions according to prior art of this problem in turn lead to another problem of increased power consumption for illumination purposes.

SUMMARY

An object of the present invention is thus to improve the control of illumination differences within an indoor space having an outer window. A further object of the present invention is to provide such control without causing non-negligible power consumption.

The above objects are achieved by systems and methods according to the enclosed patent claims. In general words, according to a first aspect, an illumination system is based on a window having controllable transmittance. The illumination system further comprises a light guide system arranged for transferring light from at least one light guide input to at least one light guide output. The light guide output is located in a same space as the window, but at a distance from the window. The illumination system further comprises a control unit arranged for balancing the transmittance of the window and a light throughput of the light guide system. Preferably, the window is an outer window of a room whereby the light guide input is arranged for gathering day light and the light guide output is arranged to illuminate an area within sight from the window. Preferably, the control unit is arranged for controlling the transmittance of the window and/or the light throughput of the light guide system. In further preferred embodiments, sensor based controlling is applied.

In a second aspect, a method for illuminating a space having a window with controllable transmittance, comprises transferring of light from at least one light guide input to at least one light guide output that is located in the space at a distance from the window. The method further comprises balancing of a transmittance of the window and a light throughput between the light guide input and the light guide output. Preferably, day light is gathered into the light guide input and the balancing comprises controlling of the transmittance of the window and/or controlling of the light throughput of the light guide system.

One advantage with the present invention is that improved indoor illumination control is achieved without any substantial need of electrical power. Another advantage with the present invention is that it is easily adapted to local conditions and requirements.

BRIEF DESCRIPTION OF THE DRAWINGS

The invention, together with further objects and advantages thereof, may best be understood by making reference to the following description taken together with the accompanying drawings, in which:

FIG. 3 is a schematic block diagram of an embodiment of an illumination system according to the present invention;

DETAILED DESCRIPTION

Throughout the drawings, the same reference numbers are used for similar or corresponding elements.

Waning energy supplies makes it urgent to find new systems for boosting the energy efficiency in the built environment. And this must be accomplished while maintaining a benign indoor environment. The invention outlined below describes a new way to achieve energy efficient day-lighting also in deep spaces.

Figure 1:
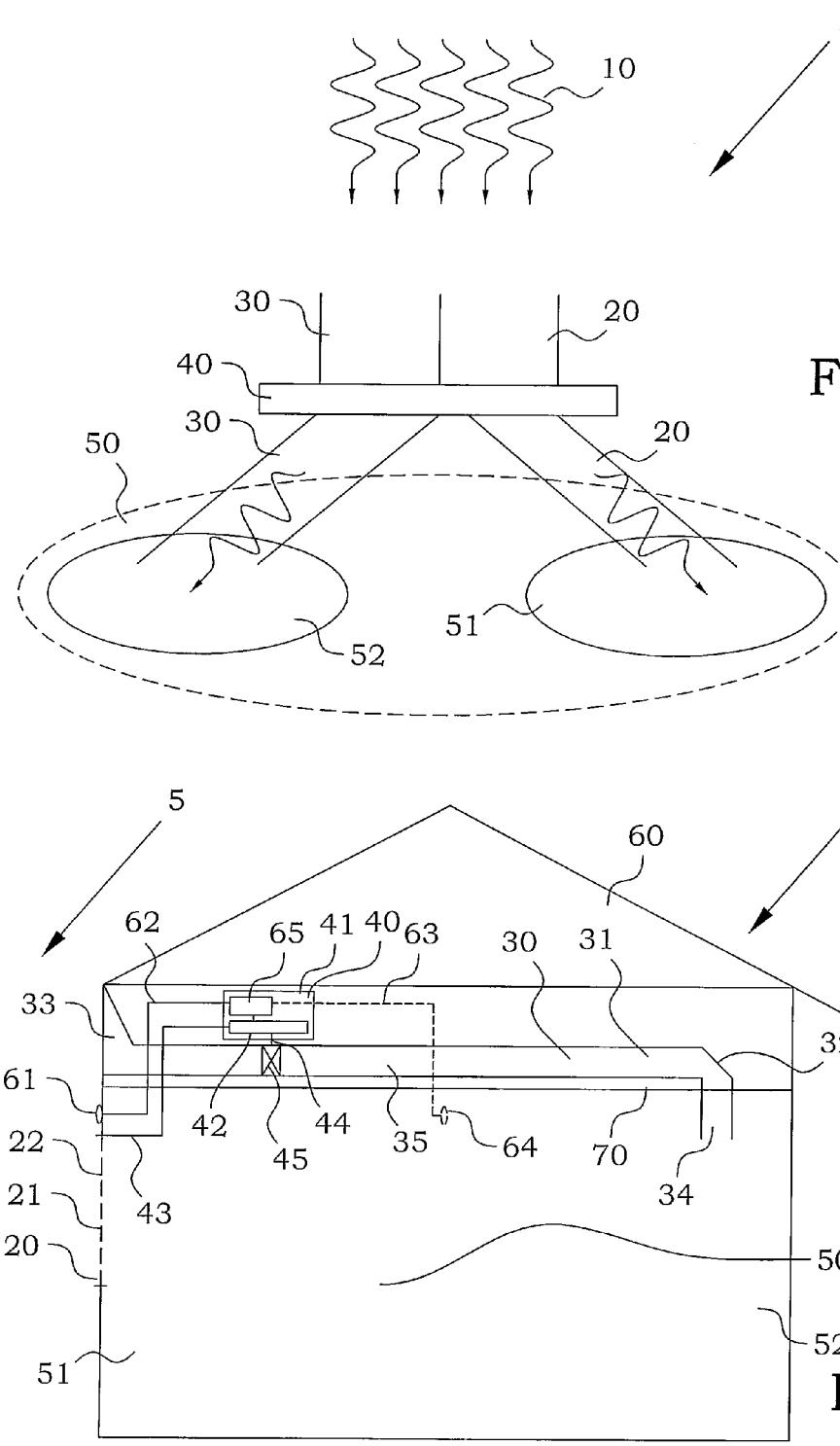
FIG. 1 is a schematic illustration of light balancing according to the present invention.

FIG. 1 illustrates the background philosophy for the present invention. An illumination system 1 makes use of radiation 10 for illuminating a space 50. The radiation 10 is provided by the day-light. The radiation 10 enters into two light path systems 20, 30. A first light path system 20 is arranged to illuminate a first area 51 of the common space 50 and the second light path system 30 is arranged to illuminate a second area 52 of the common space 50. A balancing equipment 40 is provided for balancing the amount of radiation passing the light path systems 20, 30 for providing a comfortable illumination of the space 50. In the present invention, the first light path system 20 is based on a window having controllable transmittance, and the second light path system 30 is based on a light guide system.

Figure 2:
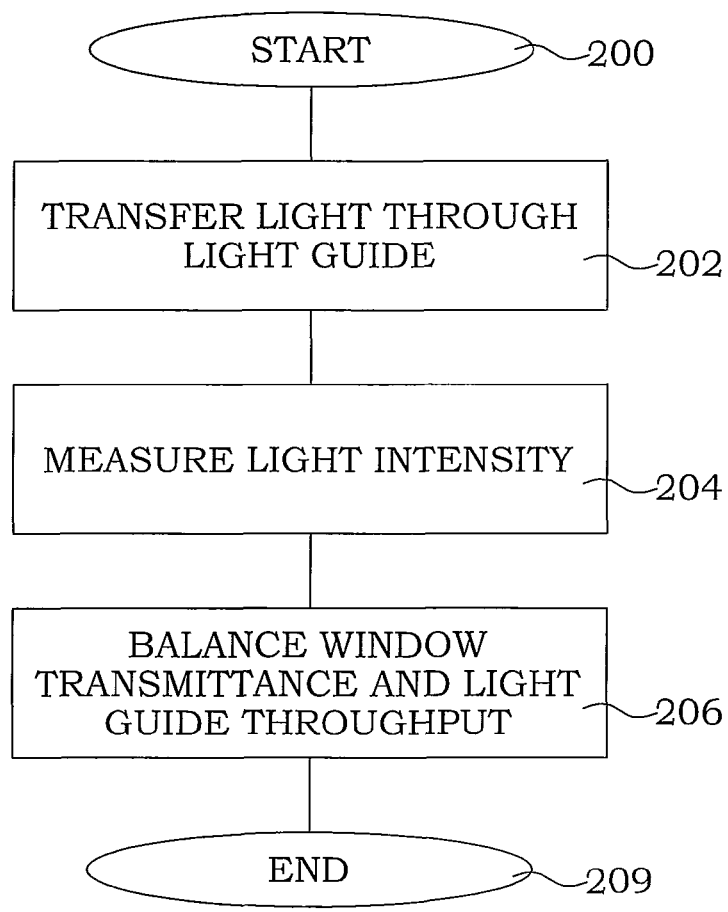
FIG. 2 is a flow diagram of main steps of an embodiment of a method according to the present invention.

FIG. 2 illustrates one particular embodiment of a method according to the present invention. A method for illuminating a space having a window with controllable transmittance starts in step 200. In step 202, light is transferred from at least one light guide input to at least one light guide output. The light guide output is located in the same space, but at a distance from the window. Preferably, day light is gathered into the light guide input. A light intensity is measured in step 204. In step 206, a transmittance of the window and a light throughput between the light guide input and the light guide output are balanced. In this embodiment, the balancing is performed responsive to the measured light intensity, obtained in step 204. The procedure ends in step 209.

In alternative embodiments, the balancing step 206 can be performed based on other criteria, e.g. as a response of an actual balancing demand. This demand could be provided manually, e.g. by turning a knob or changing a control lever. The functionality will then somewhat resemble the function of an ordinary illumination dimmer arrangement, however, in this particular case having the obvious difference that it instead controls the balance between different light flows.

Preferably, the balancing is based on some kind of automatic or semiautomatic system. Such ideas will be discussed in connection with a few exemplifying embodiments of an illumination system.

An embodiment of an illumination system 1 according to the present invention is schematically illustrated in FIG. 3. Many details are similar as in previous embodiments and will not be further discussed. A building 60 is provided with two light path systems 20, 30. The first light path system is a window 21 with controllable transmittance, in this embodiment a window covered with an electrochromic device. The window 21 is an outer window of a room, thereby connecting a space 50 with the outdoor surroundings 5. In other words, the window 21 permits day-light to penetrate through the window 21 and illuminate at least an area 51 close to the window 21. The space 50, i.e. in this embodiment the room inside the window has a ceiling 70. The second light path system 30 is a light guide system 31, which is provided essentially above the ceiling 70. In this embodiment, the light guide system 31 comprises a light pipe 35, transferring light between a light guide input 33 and a light guide output 34. The light guide input 33 is arranged for gathering day light and is situated in a vicinity of the window 21. A mirror 32 provides for directional changes of the light in the light pipe 35. The light guide output 34 is located in the same space as the window 21, but at a distance from the window 21, and provides illumination of an area 52. The light guide output 34 is here arranged to illuminate an area 52 within sight from the window 21.

The illumination system 1 of the present embodiment further comprises a balancing equipment 40 comprising a control unit 41 arranged for balancing a transmittance of the window 21 and a light throughput of the light guide system 31. In the present embodiment, the control unit 41 is arranged for controlling the transmittance of the window 21. As mentioned above, the window 21 is in the present embodiment provided with a chromogenic device, in this case an electrochromic device 22. The meaning of "chromogenic device" is exemplified and described further below. The control unit 41 comprises a voltage supply 42, an output voltage of which is variable. The variable voltage is connected to the electrochromic device 22 by electrical connections 43, thereby controlling the transmittance of the electrochromic device 22. In alternative embodiments, wireless control solutions can be employed.

A typical electrochromic device 22 comprises five superimposed layers deposited on one substrate or positioned between two substrates in a joined together configuration. The central part of the five layer electrochromic stack is an ion conductor (electrolyte). The ion conductor is in contact with an electrochromic film, capable of conducting electrons as well as ions. On the other side of the ion conductor is an electron and ion conducting counter electrode film serving as an ion storage layer. The central three-layer structure is positioned between electron conducting layers. Such as device is colored/bleached by applying an external voltage pulse between the electron conducting layers on the two sides of the stack, causing the electrons and ions to move between the electrochromic and counter electrode layer.

The control unit 41 in the present embodiment is also arranged for controlling the light throughput of the light guide system 31. An electrochromic device 45 is provided in the light path of the light guide system 31. The electrochromic device 45 is connected by electrical connections 44 to another output of the voltage supply 42. By increasing the coloring of the electrochromic device 45, the light throughput of the light guide system 31 can be reduced. The two outputs of the voltage supply are individually controllable, in order to admit individual control of the electrochromic device 22 and the electrochromic device 45.

The illumination system 1 of the present embodiment further comprises a light sensor 61 connected by connections 62 to a sensor read-out unit 65. The sensor read-out unit 65 is connected to or even integrated in the control unit 41. The light sensor 61 is in the present embodiment positioned outside, but in the vicinity of the window 21 and also in the vicinity of the light guide input 33. A measured light intensity of the light sensor 61 is thereby a good representation of the light intensity available from the day light. The control unit 41 is arranged to balance the transmittance of the window 21 and the light throughput of the light guide system 31 responsive to a signal from the light sensor 61. This is performed by controlling the voltages of the two outputs from the voltage supply 42. If a high intensity day light is available, the contrast between the first area 51 and the second area 52 may be too large. The voltages of the voltage supply 42 can then be controlled in order to increase the throughput of the light guide system 31, thereby increasing the illumination of the second area 52, and/or decreasing the transmittance through the window 21, thereby decreasing the illumination of the second area 51. If the day light intensity is low, more day light may be permitted to be transmitted through the window 21. More details and examples of controlling possibilities are discussed further below.

In a similar embodiment, a light sensor 64 can instead be provided inside the room, i.e. the light sensor 64 is positioned within the space 50 of the window 21 and the light guide output 34. The light sensor 64 is then in a similar manner connected to the control unit 41 by connections 63. In such a case, the control of the voltage outputs is preferably arranged to maintain the measured light intensity at a constant level as long as there is enough light available.

In an illumination system according to the above ideas, a window having controllable transmittance is used. There are "smart windows" as such available in prior art. The smart windows are capable of decreasing the transmittance while being able to maintain unmitigated visual contact through the window, i.e. between indoors and outdoors. "Smart windows" based on chromogenic devices are able to vary their throughput of day-light and solar energy by an external stimulus. The stimulus can be irradiation intensity, i.e. the system is a photochromic system comprising a photochromic device. The stimulus can be temperature, i.e. the system is a thermochromic or thermotropic system comprising a thermochromic or thermotropic device. Thermochromic devices change their color upon temperature changes, while thermotropic devices change their phase. The stimulus can be exposure to a reducing or oxidizing system, i.e. the system is a gasochromic system comprising a gasochromic device. The stimulus can also be electricity, i.e. the system is an electrochromic system comprising an electrochromic device. The latter are, as mentioned earlier, presently in use in buildings, albeit on a small scale. Any of these approaches are possible to use in different embodiments of an illumination system.

The use of light guide systems enables energy efficient solutions. The light guides have one end exposed to day-light at the exterior of the building and are able to transport this light to recessed spaces using, for example, internally reflecting cavities or optically transparent cables. Light guide systems as such are also known in prior art. Light-guiding systems are in use on a limited scale to provide day-lighting of deep spaces, i.e. far from windows, in buildings. They are of two general types. In the above embodiment, reflecting cavities are used that are able to transport light through multiple reflections. Another solution is optically transparent "cables", normally devised so that total internal reflection of light takes place. Electrochromic technology can be used to regulate the transmission of light in the light-guide either at the light input, output, or at an intermediate position. However, as described further below also mechanical arrangements are possible.

The present invention combines a "smart window", for which the transmittance that can be regulated by an external stimulus, with a system of light-guides, for which the light output can be individually regulated. Also included is a control system capable of balancing the different light sources for maintaining an even level of illumination also in deep spaces.

The combination of "smart windows" technology and light-guiding technology having a common balancing is new and gives entirely new vista in day-lighting technology. Typically, the "smart window" should be dimmed so that glare and discomfort are avoided for persons close to the window. Theses persons may, however, still enjoy the view of the outdoors scenery. The light output from the light guiding system should preferably be tuned so that the light level is experienced as even in the space. If the light-guiding system comprises several luminaries, these may be individually regulated. In a typical situation with identical luminaries, the light output should generally be larger the farther from the "smart window" they are positioned. A combination with electrical lighting is not excluded, but it should be noted that the need for electrical energy is decreased by the use of light-guides.

The full benefit of the day-lighting system can be obtained by integrating also a control system to make the "smart window" operate in conjunction not only with the light-guide luminaries but also possibly with auxiliary electrical luminaries. This control system can, as indicated above, be active and embody measurements of the light level at pre-selected positions, or it can be passive and maintain the transmittance level of the "smart window" and the output from the light guided luminaries at pre-set ratios or according to manual settings.

A physiological perspective on the technology may be illustrative. Under normal conditions for day-lighting of deep spaces, the eye adjusts to the strong light at the window. The pupil is small, and the eye experiences areas away from the window as uncomfortably dark irrespective of the light being sufficient for seeing with an open pupil. Dimming the light at the window and, simultaneously providing light-guided day-lighting to recessed spaces has as a consequence that the pupil adapts to the prevailing, even lighting. Thus good lighting is obtained with minimized need for electricity.

A few further embodiments will explain the control possibilities further.

Figure 4:
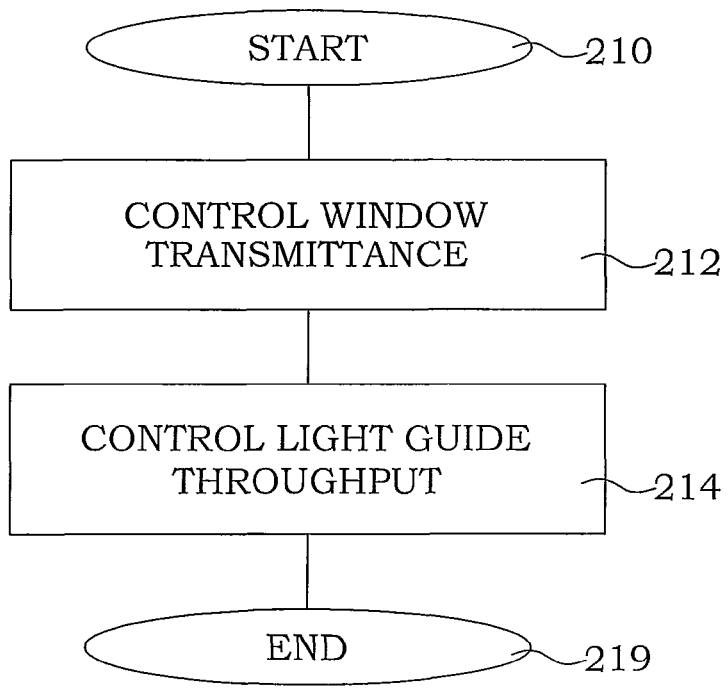
FIG. 4 is a flow diagram of main steps of an embodiment of a balancing procedure according to the present invention.

One embodiment of the balancing step 206 in FIG. 2 is illustrated in FIG. 4. The balancing starts in step 210. In step 212, a transmittance of the window is controlled, and in step 214, a throughput of the light guide is controlled. The procedure ends in step 219. For highest flexibility, it is preferred to enable control of both light paths. However, in simple, more cost efficient embodiments, control of only one of the light paths may be sufficient, at least if there is good knowledge about the illumination characteristics of the space to be illuminated. This means that in such solutions only one of the steps 212 or 214 are necessary. However, as mentioned above, the preferred manner is to control both light paths. The control flexibility will become apparent for anyone skilled in the art from the different embodiments of the present disclosure.

Figure 5:
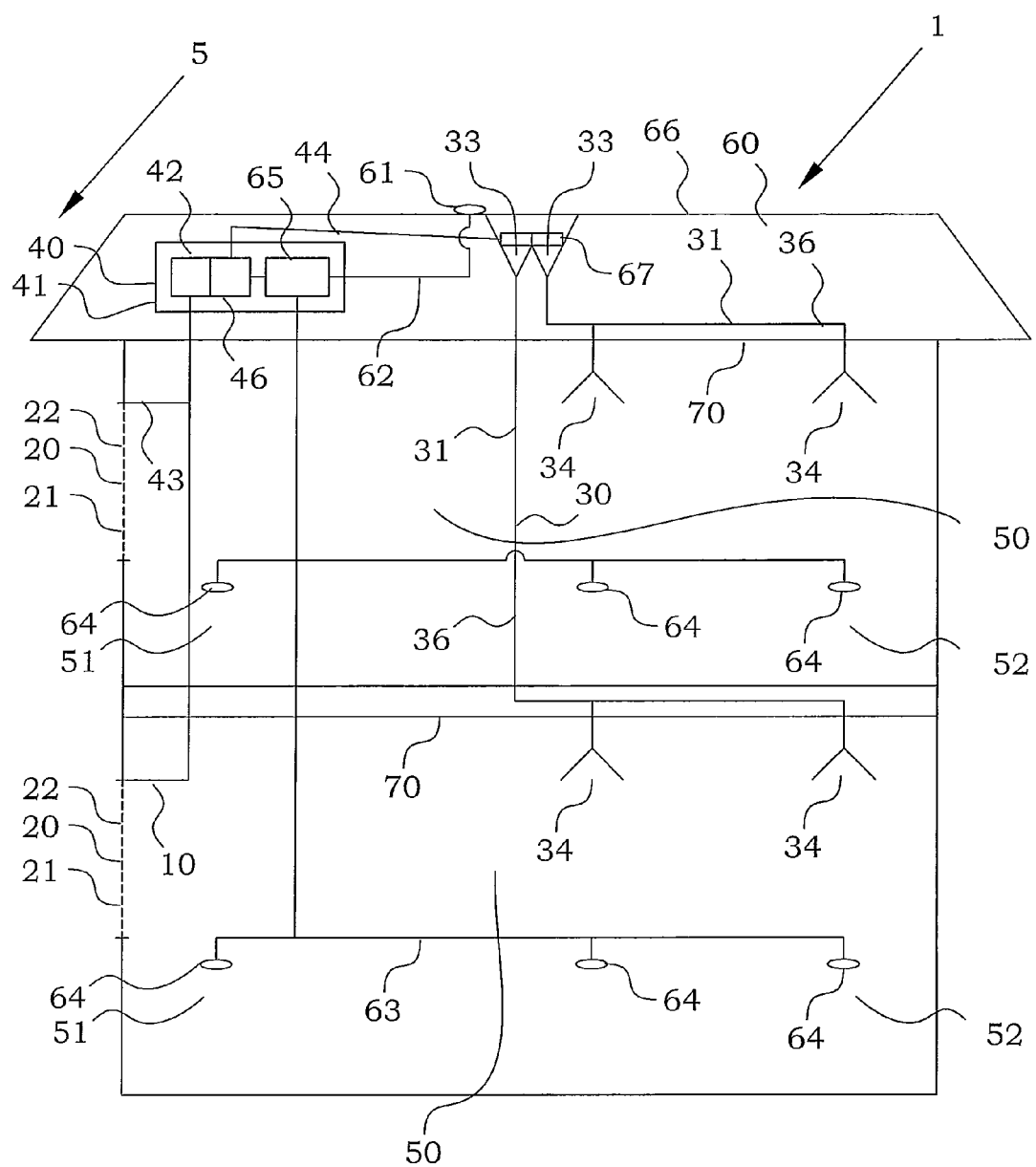
FIG. 5 is a schematic block diagram of another embodiment of an illumination system according to the present invention.

An embodiment of an illumination system 1 according to the present invention is schematically illustrated in FIG. 5. In this embodiment, the building 60 is a two-store building, having a light guide system with two light guide inputs 33 and two light guide outputs 34 for each light guide input 33. The light guide inputs 33 and outputs 34 are connected by optical fibers 36. The light guide inputs 33 are situated at a roof 66 of the building 60. The throughput of the light guide system 31 is controlled by a mechanical aperture 67 provided at the light guide inputs 33. The throughput of each optical fiber 36 is controlled separately. The aperture 67 can be provided anywhere in the light path of the light guide system 31 and is controlled by an aperture control unit 46 in or connected to the control unit 41.

A light sensor 61 is positioned in a vicinity of the light guide inputs 33, to track the available light intensity for use in the light guide system. The illumination system 1 of the present embodiment comprises a plurality of light sensors 64 distributed within the space that is to be illuminated. The light sensors 64 are connected to the control unit 41. The control unit is in the present embodiment arranged to balance the transmittance of the window 21 and a light throughput of the light guide system 31 responsive to signals from the light sensors 64. The actual control strategy may be different for different sites, but two objects are usually considered. The light intensity should be kept over a certain predetermined threshold in order to maintain a sufficient illumination of the space. Furthermore, it is typically also requested to reduce any light intensity difference between different spots in the space 50, and in particular between the locations of the light sensors 64.

Figure 6:
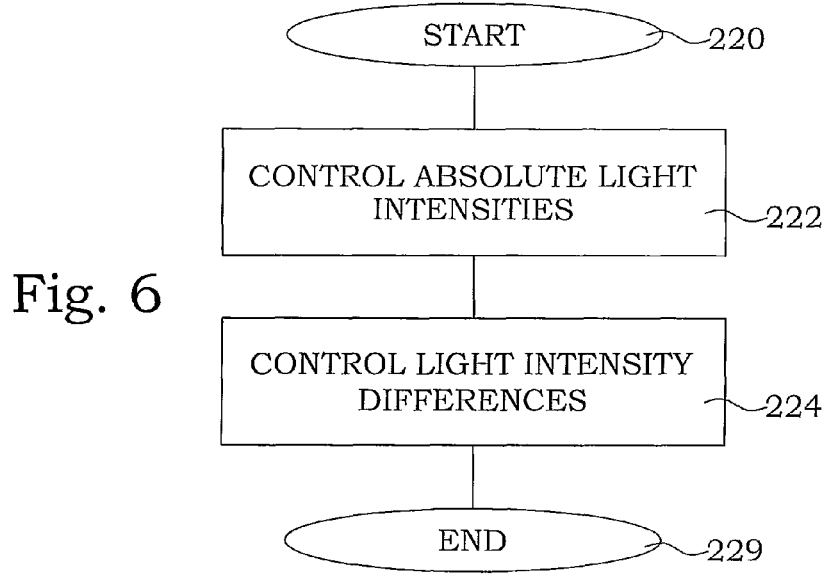
FIG. 6 is a flow diagram of main steps of an embodiment of a balancing procedure according to the present invention.

These ideas are illustrated by the flow diagram of FIG. 6. An embodiment of a balancing step is illustrated and starts in step 220. In step 222, an absolute light intensity level is controlled, and in step 224, a light intensity difference between different locations within the space to be illuminated is controlled. The procedure ends in step 229.

Figure 7:
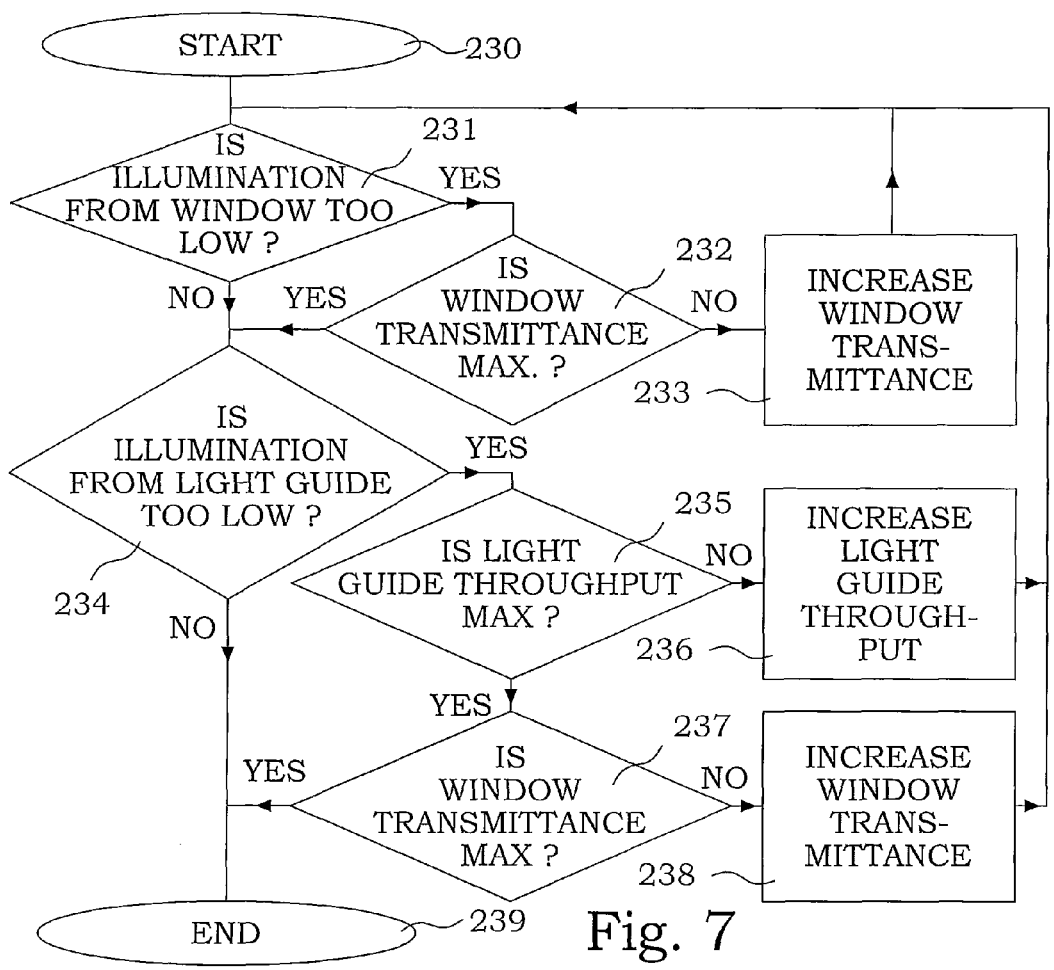
FIG. 7 is a flow diagram of main steps of an embodiment of a part of FIG. 6.

One detailed embodiment of step 222 is further illustrated in FIG. 7. Here, it is assumed that there is one window and one light guide output in the space to be illuminated, and that there are light sensors in a vicinity of respective light sources. The controlling starts in step 230. In step 231 it is determined whether the light intensity close to the window is too low. If that is the case, the procedure continues to step 232, where it is checked if it is possible to increase the transmittance of the window further. If there is further transmittance to utilize, the transmittance of the window is increased in step 233, and the process returns again to step 231. Since the window and consequently the light sensors react on the control, there will be a loop until either the intensity is enough or the transmittance is the highest possible. In such a case, the process continues to step 234. In step 234, a similar determination whether the light intensity close to the light guide output is too low is performed. If so, the light guide throughput level is checked in step 235, and if there still are margins left, the throughput is controlled in step 236 to increase the throughput. If no margin is left, it is instead checked in step 237 if more light can be provided through the window, and in such a case, the transmittance of the window is increased in step 238. When all light intensity levels are sufficient or when no further day light intensity is available, the procedure ends in step 239. The process thereby aims to maintain a measured light intensity at a constant level as long as there is enough light available.

Figure 8:
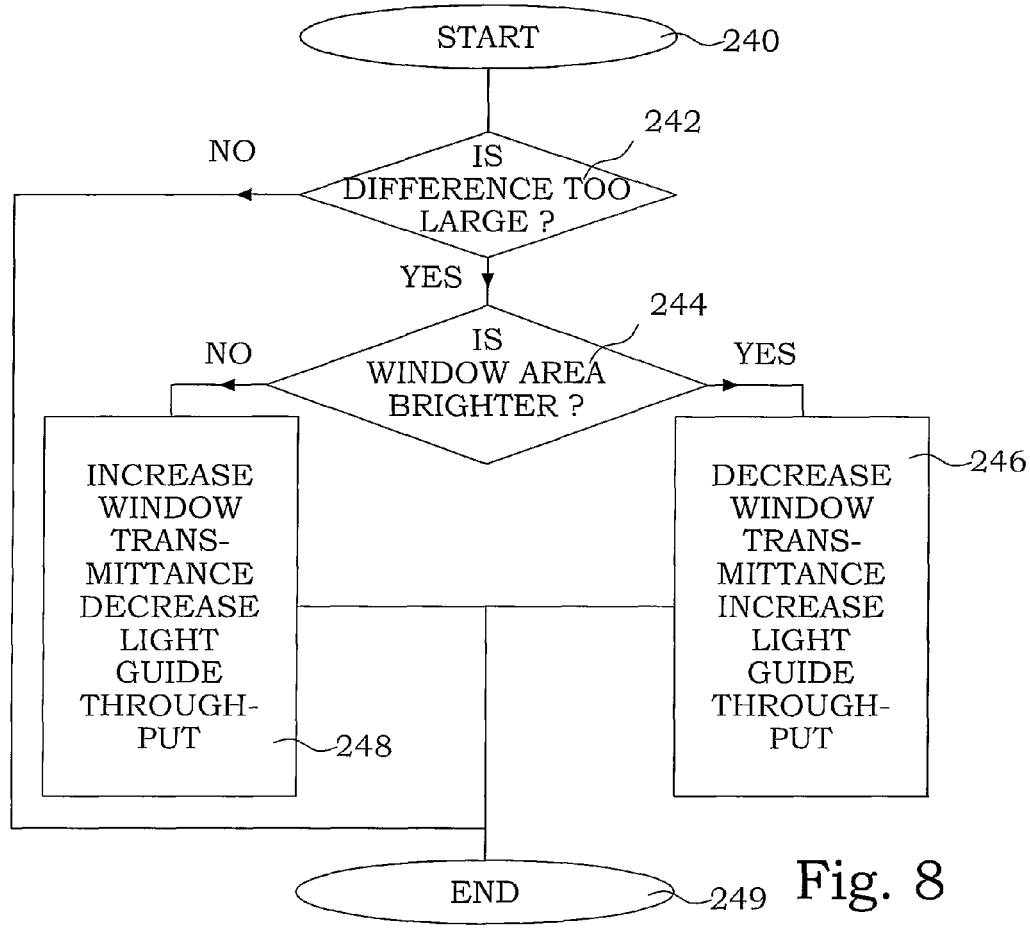
FIG. 8 is a flow diagram of main steps of an embodiment of another part of FIG. 6.

One detail embodiment of step 224 is further illustrated in FIG. 8. The controlling starts in step 240. In step 242 it is determined whether the light intensity difference between a position close to the window and a position close to the light guide output is too high. If the difference is too high, the procedure continues to step 244, where it is concluded whether the difference is caused by a higher illumination close to the window. If that is the case, the procedure continues to step 246, where the transmittance of the window is controlled to be decreased and where the throughput of the light guide system is increased, if possible. If the position at the light guide output instead is too bright, the procedure continues to step 248, where the transmittance of the window is controlled to be increased, if possible, and where the throughput of the light guide system is decreased. The process ends in step 249.

If the procedures of FIGS. 7 and 8 are performed essentially continuously, the result will be an illumination of the space, having an as small intensity difference between the window area and an inner area at the light guide output which is comfortably low as long as there are regulating possibilities left.

Figure 9:
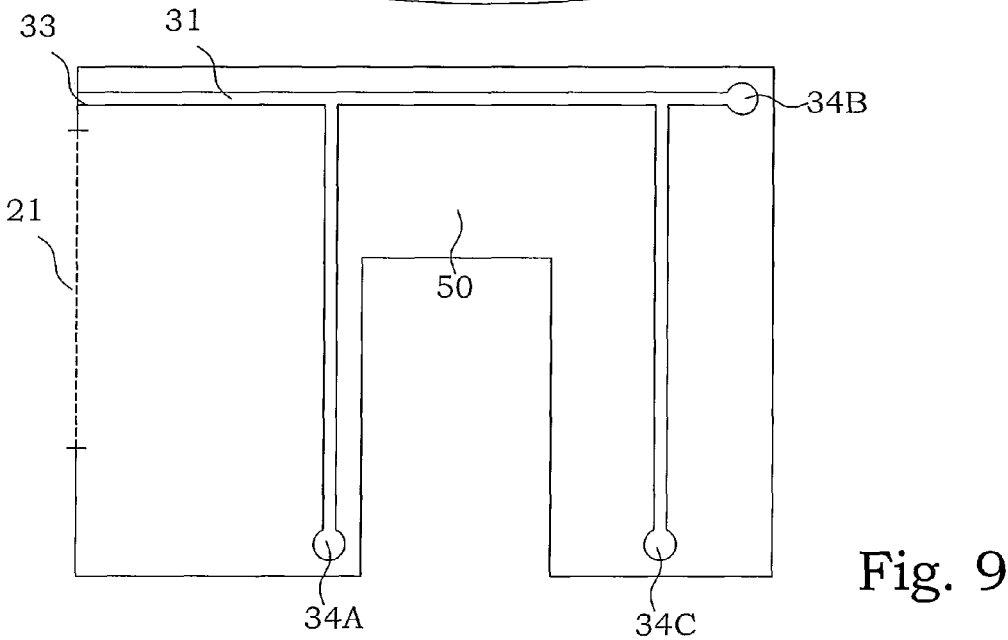
FIG. 9 is a top view of a space in which illumination according to an embodiment of the present invention can be applied.

The details of the controlling depend at least to a part on the application and the geometrical shape of the space to be illuminated. In FIG. 9, a schematic top view of a space, where the present invention is applied is illustrated. The light guide system 31 comprises here one light guide input 33 and three light guide outputs 34A-C. Light guide output 34A is situated fairly close to the window and in direct view from the window. Light guide output 34B is situated in a far inner corner of the space 50, but still in direct view from the window. Finally, light guide output 34C is situated in another corner and without direct visual contact with the window. In such a situation, it is preferable to control the throughput of the light guide system 31 separately for the three light guide outputs 34A-C. Light guide output 34A is mainly provided for reducing high light intensity gradients in an area not too far from the window. The absolute light intensity is believed to be kept sufficient only by light from the window. For the light guide output 3413, the absolute illumination level in the room corner will probably be heavily dependent on the throughput of the light guide system 31. However, since there is a direct visual contact with the window, also contrast issues are important. For light guide output 34C, there is no direct visual contact with the window 21, and light intensity gradient issues are here only of interest relative the light guide output 34B. However, here the illumination level is essentially completely dependent on the contribution from the light guide system 31.

In view of the above discussion, anyone skilled in the art realizes that the detailed control routines typically have to be adapted to the space and situation in which they are going to be implemented.

So far, only use of light sensors has been discussed. However, the balancing according to the present invention can advantageously also be dependent on other additional factors.

Figure 10:
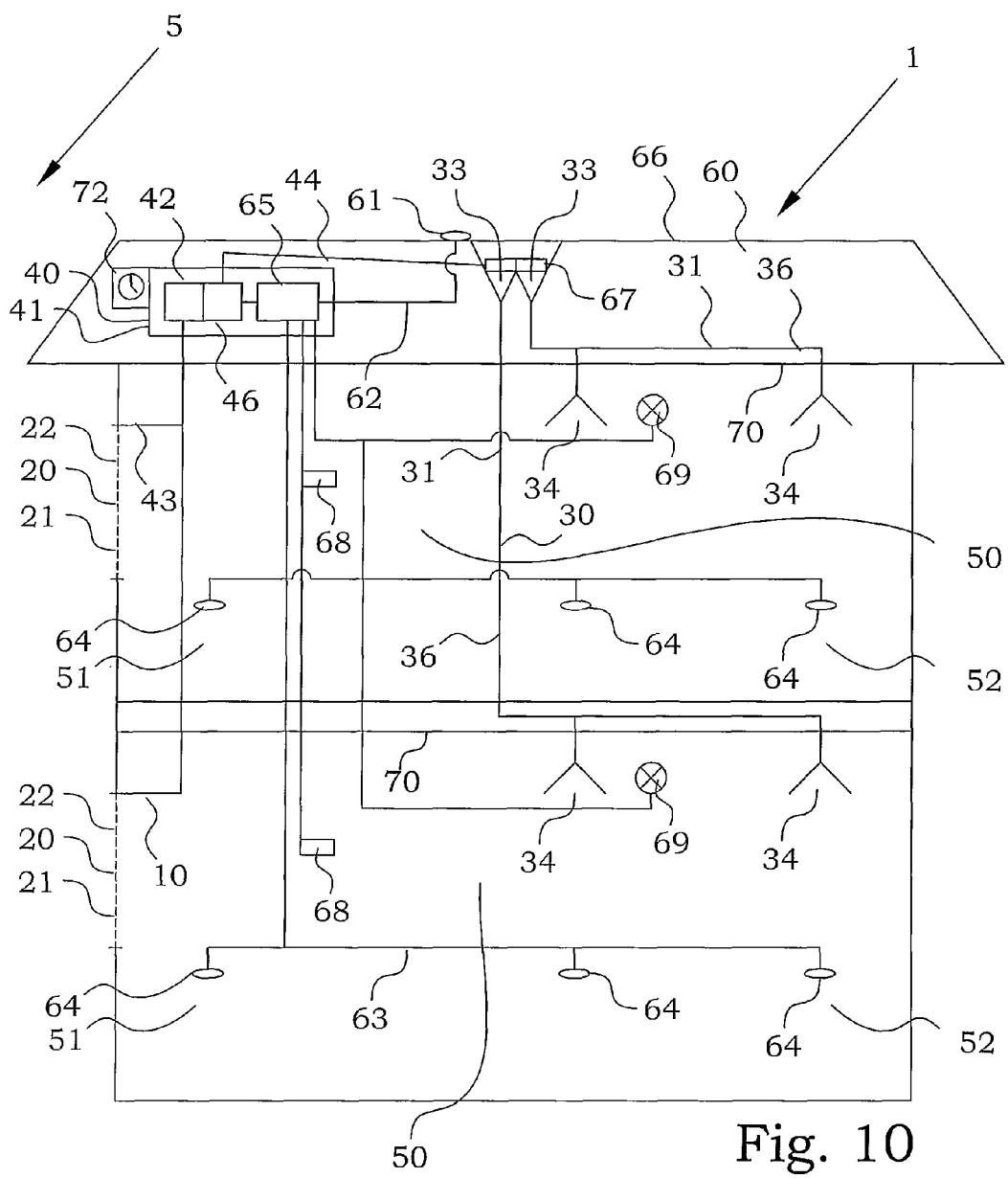
FIG. 10 is a schematic block diagram of yet another embodiment of an illumination system according to the present invention.

An embodiment of another illumination system 1 according to the present invention is schematically illustrated in FIG. 10. The system resembles the system of FIG. 5, however, additional sensors are now provided. A thermometer, i.e. a temperature sensor 68 is provided in each space 50. A detector 69, arranged for detecting any presence of a person in the space 50 is also provided. Furthermore, a timer 72, keeps track of the present time. The sensors 68, 69 and the timer 72 are connected to the control unit 41, which enables the control unit to base the light balancing also on presence, temperature and time.

The dependence on time could simply be a selection of different balancing approaches depending of whether it is day or night, a working day or weekend, summer or winter etc.

Figure 11:
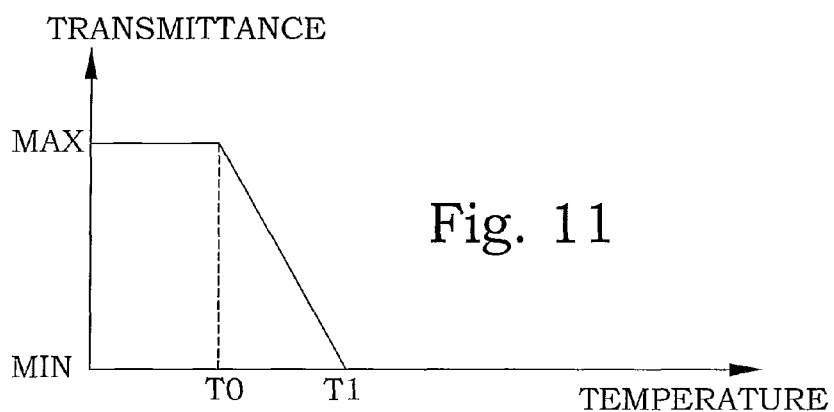
FIG. 11 is a diagram illustrating a temperature dependence of target transmittance.

The balancing dependence on temperature can be performed more elaborately. If the temperature in the room is low, the general admittance of light assists in heating the space 50. A higher general intensity level can then be accepted. Also, if the temperature in the room is too high, a low general light intensity may be advantageous in order not to increase the temperature further. FIG. 11 illustrates one example of how the room temperature may influence the transmittance/throughput of the window/light guide system. At temperatures below T0, a target transmittance is 1. However, the actual level may also be influenced, e.g. by intensity differences. In an intermediate region, the target transmittance is reduced, and above T1, the target transmittance is zero.

The temperature sensor may also be situated just outside the window, giving an outdoor temperature to regulate on instead.

Figure 12:
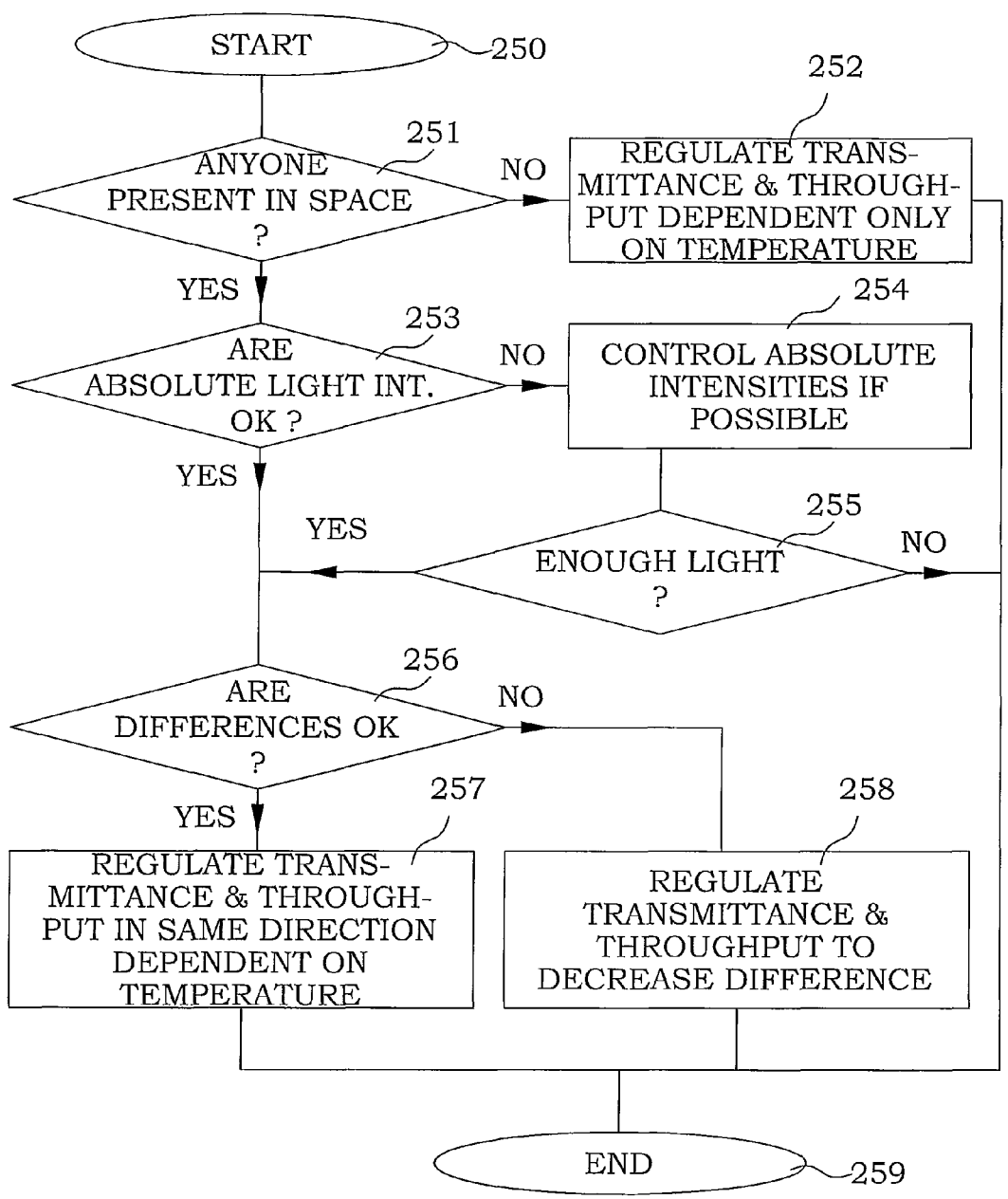
FIG. 12 is a flow diagram of main steps of another embodiment of a balancing procedure according to the present invention.

FIG. 12 illustrates a flow diagram of an embodiment of a balancing procedure according to the present invention. The procedure assumes at least two light sensors, a temperature sensor and a presence sensor. The procedure starts in step 250. In step 251, the read-out from the presence sensor is used to determine whether any person is present within the space of interest. If no person is present, no concern has to be taken about light intensity or light intensity differences, and the light balancing regulation can be entirely directed to assisting in keeping an appropriate temperature. Therefore, in step 252, transmittance of the window and throughput of the light guide system is determined entirely by requested temperature, e.g. according to FIG. 11. These ideas, as such, resemble the ideas presented in e.g. U.S. Pat. No. 6,965,813.

If anyone is present within the space of interest, the light conditions will prevail for balancing purposes. In step 253, it is checked whether absolute light intensity levels are appropriate. If that is not the case, window transmittance and/or light guide system throughput will be controlled, if possible, to reach appropriate levels. If the available light sources are too small, as decided in step 255, additional adjustment has to rely on electrical light sources, and the balancing procedure is ended. If acceptable absolute light intensity levels are reached, adjustment margins are still available and the procedure continues to step 256. Here, the light intensity differences are investigated. If the differences in light intensity are low enough, any remaining adjustment margin is used in step 257 to assist in keeping a requested temperature. This means in general that any adjustments of the transmittance and throughput are made in the same direction, because this will reduce the probability of increasing the light intensity differences to an inappropriate level. If the differences in light intensity are too high, transmittance and throughput are adjusted to reduce such differences. In a typical case, transmittance and throughput are then adjusted in opposite directions. The procedure ends in step 259.

Anyone skilled in the art realizes that the light balancing procedures are possible to modify in many respects, having different conditional requests that typically will be highly dependent on the actual site.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Illumination system, comprising:
 a window having controllable transmittance,
 a light guide system arranged for transferring light from at least one light guide input to at least one light guide output;
 said at least one light guide output being located in a same space as said window, but at a distance from said window,
 wherein light passing through said light guide system does not pass through said window and light passing through said window does not pass through said light guide system, said light guide system being arranged for illuminating said same space by light passing said light guide system; and
 balancing arrangement having a control unit arranged for balancing said transmittance of said window and a light throughput of said light guide system,
 wherein said balancing changes an amount of light passing through said light guide system relative to an amount of light passing through said window.

2. Illumination system according to claim 1, wherein said window is an outer window of a room and said at least one light guide input is arranged for gathering day light.

3. Illumination system according to claim 1, wherein said at least one light guide output is arranged to illuminate an area within sight from said window.

4. Illumination system according to claim 1, wherein said control unit is arranged for controlling said transmittance of said window.

5. Illumination system according to claim 4, wherein said balancing arrangement comprises a chromogenic device.

6. Illumination system according to claim 5, wherein said balancing arrangement comprises an electrochromic device, a variable voltage supply and electrical connections between said variable voltage supply and said electrochromic device.

7. Illumination system according to claim 1, wherein said control unit is arranged for controlling said light throughput of said light guide system.

8. Illumination system according to claim 1, further comprising a light sensor connected to said control unit, and wherein said control unit is arranged to balance said transmittance of said window and a light throughput of said light guide system responsive to a signal from said light sensor.

9. Illumination system according to claim 8, comprising a plurality of light sensors connected to said control unit, and wherein said control unit is arranged to balance said transmittance of said window and a light throughput of said light guide system responsive to signals from said plurality of light sensors.

10. Illumination system according to claim 9, wherein said control unit is arranged to reduce a light intensity difference between said plurality of light sensors.

11. Illumination system according to claim 1, wherein said at least one light guide input is situated in a vicinity of said window.

12. Illumination system according to claim 1, wherein said light guide system comprises an optical fiber.

13. Method for illuminating a space having a window with controllable transmittance, comprising the steps of:
 transferring light from at least one light guide input to at least one light guide output being located in said space at a distance from said window for illuminating said same space by said light transferred from said at least one light guide input to said at least one light guide output,
 wherein light passing through said light guide output does not pass through said window and light passing through said window does not pass through said light guide output; and
 balancing a transmittance of said window and a light throughput between said at least one light guide input and said at least one light guide output,
 wherein an amount of light passing through said light guide output relative to an amount of light passing through said window is changed.

14. Method according to claim 13, comprising the further step of:
 gathering day light into said at least one light guide input.

15. Method according to claim 13, wherein said step of balancing in turn comprises the step of controlling said transmittance of said window.

16. Method according to claim 13, wherein said step of balancing in turn comprises the step of controlling said light throughput of said light guide system.

17. Method according to claim 13, comprising the further step of: measuring a light intensity, whereby said step of balancing is performed responsive to said measured light intensity.

18. Method according to claim 17, wherein light intensity is measured at a plurality of locations, whereby said step of balancing is performed responsive to said measured light intensity at said plurality of locations.

19. Method according to claim 13, wherein said step of balancing is performed to maintain a measured light intensity at a constant level as long as there is enough light available.

20. Method according to claim 13, wherein said step of balancing is performed to reduce a light intensity difference between different locations within said space.

* * * * *